T. W. PORTER.
Axe-Helve Fasteners.

No. 149,245. Patented March 31, 1874.

WITNESSES.
Eugene Humphrey
Henry K. Porter

INVENTOR.
T. W. Porter

UNITED STATES PATENT OFFICE.

THOMAS W. PORTER, OF BOSTON, MASSACHUSETTS.

IMPROVEMENT IN AX-HELVE FASTENERS.

Specification forming part of Letters Patent No. 149,245, dated March 31, 1874; application filed February 18, 1874.

*To all whom it may concern:*

Be it known that I, THOMAS W. PORTER, of Boston, in the county of Suffolk and State of Massachusetts, have invented a new and useful Improvement in Ax-Helve Fastener, of which the following is a specification:

This invention relates to a device to be driven into the end of the helve after it (the helve) has been inserted in the eye of the ax; and the invention consists in a metallic wedge, formed with a flanged head and holes, indentations, or raised spurs to hold the fastener in place.

Figure 1:
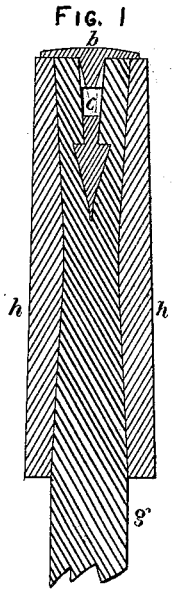
Figure 3:
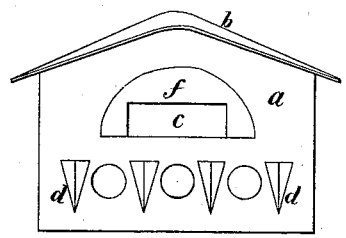
Figure 2:
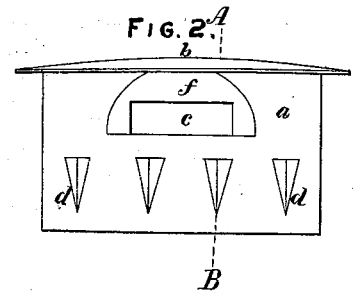
Figure 4:
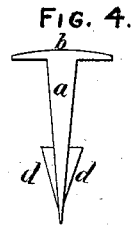
Figure 5:
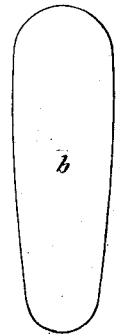

Figure 1 is a section taken through the ax, the helve, and the fastener on line A B, Fig. 2. Fig. 2 is a side elevation or plan view of the fastener. Fig. 3 is a similar elevation, showing a fastener used in hatchets and broad-axes. Fig. 4 is an edge view or elevation of the fastener. Fig. 5 is a plan view of the flange-head.

The eyes of axes are formed, as shown in Fig. 1, smallest in the center and enlarging toward each end; hence the end of the helve, in order that it may pass the center of the eye, must be smaller than the outer end of the eyes, and in order to secure it firmly in place it is customary to wedge it with a wedge of wood, or other material; but on account of the violent strain and concussion to which the ax and helve are both subjected in use, the wedge is liable to work loose and fall out, leaving the head of the helve but partially filling the outer half of the eye. The want of "ax-men" is a fastener that is inexpensive, that will not be displaced by shocks and strain, and which can yet be readily removed in case it becomes necessary so to do.

To accomplish these various results I provide a fastener, formed of iron, having the head $b$ slightly larger than the orifice of the eye, so that the handle, even if rendered loose by shrinkage, cannot withdraw and take the fastener with it, the wedge part $h$ pressing the helve against the walls of the eye with great force and compressing the wood, so that there is scarce a possibility of its becoming loose, while the raised semi-pyramidal projections $d$, which enter easily, serve to hold the wedge in place and prevent the concussion of violent blows from loosening it in the helve; the hole $c$ and concave portion $f$ also tending, by the slight projection of the helve therein, to hold the fastener in position. When it is desired to remove the helve from the ax, the fastener can be withdrawn by inserting any blunt instrument between its flanged head and the cheeks $h$ of the ax, and thereby prying it out.

I claim as my invention—

A metallic ax-helve fastener constructed in form as and for the purpose substantially as described and shown.

THOMAS W. PORTER.

Witnesses:
 EBEN HUTCHINSON,
 HENRY K. PORTER.